(12) United States Patent
Adikane et al.

(10) Patent No.: US 10,842,165 B2
(45) Date of Patent: Nov. 24, 2020

(54) APPARATUS AND METHOD FOR SEPARATING WHEY PROTEINS FROM WHEY USING THE SAME

(71) Applicant: COUNCIL OF SCIENTIFIC & INDUSTRIAL RESEARCH, New Delhi (IN)

(72) Inventors: Harshavardhan Vishavanath Adikane, Pune (IN); Mahendra Devram Jagtap, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 175 days.

(21) Appl. No.: 16/099,921

(22) PCT Filed: May 11, 2017

(86) PCT No.: PCT/IN2017/050176
§ 371 (c)(1),
(2) Date: Nov. 8, 2018

(87) PCT Pub. No.: WO2017/195221
PCT Pub. Date: Nov. 16, 2017

(65) Prior Publication Data
US 2019/0150465 A1    May 23, 2019

(30) Foreign Application Priority Data
May 11, 2016   (IN) .............................. 201611016370

(51) Int. Cl.
*A23C 9/146*    (2006.01)
*A23C 9/142*    (2006.01)
(Continued)

(52) U.S. Cl.
CPC .......... *A23C 9/1425* (2013.01); *A23C 9/1465* (2013.01); *A23J 1/205* (2013.01);
(Continued)

(58) Field of Classification Search
None
See application file for complete search history.

(56) References Cited

U.S. PATENT DOCUMENTS

| | | | | |
|---|---|---|---|---|
| 2,681,846 A | * | 6/1954 | Guthrie | .................... B01J 39/22 8/120 |
| 4,154,676 A | * | 5/1979 | Jones | ...................... C08B 11/14 210/675 |
| 5,986,063 A | * | 11/1999 | Etzel | ...................... A23J 1/205 426/580 |

FOREIGN PATENT DOCUMENTS

| | | |
|---|---|---|
| FR | 2487642 A2 | 2/1982 |
| WO | WO-9302098 A1 * 2/1993 | .............. B01J 47/12 |

(Continued)

OTHER PUBLICATIONS

International Search Report; International Application No. PCT/IN2017/050176; International Filing Date—May 11, 2017; dated Sep. 20, 2017.

Primary Examiner — Matthew O Savage
(74) Attorney, Agent, or Firm — Cantor Colburn LLP (57) ABSTRACT

The present invention provides a method for the production of whey proteins in a single step process using combination of chromatography and membrane filtration technique, comprising treating cotton cloth with a mixture of chlorosulphonic acid and chloroform and then subsequently treating it with chloroform, dilute NaOH, glycine and water to recover modified cotton cloth as the product, thereafter fixing product in a membrane filtration device equipped with modified flow pattern and then equilibrating it with equilibration buffer, followed by loading of whey for adsorption
(Continued)

of protein on the product and washing of the product with equilibration buffer, thereafter elution of adsorbed proteins with elution buffer, and then regeneration of the product by treating it with dilute HCl and water to reuse the product.

10 Claims, 4 Drawing Sheets

(51) Int. Cl.
    *A23J 1/20*       (2006.01)
    *B01J 39/22*      (2006.01)
    *B01J 39/26*      (2006.01)
    *B01J 47/014*     (2017.01)
    *B01D 15/36*     (2006.01)
    *B01J 47/12*      (2017.01)
    *B01D 37/02*     (2006.01)
    *B01D 37/04*     (2006.01)
    *B01D 39/08*     (2006.01)

(52) U.S. Cl.
    CPC ......... *B01D 15/362* (2013.01); *B01D 37/025* (2013.01); *B01D 37/043* (2013.01); *B01D 37/046* (2013.01); *B01D 39/083* (2013.01); *B01J 39/22* (2013.01); *B01J 39/26* (2013.01); *B01J 47/014* (2017.01); *B01J 47/12* (2013.01)

(56) References Cited

FOREIGN PATENT DOCUMENTS

| | | |
|---|---|---|
| WO | 200228194 A1 | 4/2002 |
| WO | 2010023361 A2 | 3/2010 |

\* cited by examiner

Figure 8

APPARATUS AND METHOD FOR SEPARATING WHEY PROTEINS FROM WHEY USING THE SAME

CROSS REFERENCE TO RELATED APPLICATIONS

This application is a National Stage application of PCT/IN2017/050176, filed May 11, 2017, which claims the benefit of Indian Patent Application No. 201611016370, filed May 11, 2016, and all the benefits accruing therefrom under 35 U.S.C. § 119, the content of which is incorporated by reference in its entirety.

FIELD OF THE INVENTION

The present invention is related to an apparatus useful for separating whey proteins from whey. The invention also relates to a method for separating whey proteins from whey using the apparatus.

BACKGROUND OF THE INVENTION

Whey is a watery part (serum) that remains after the coagulation of milk by acid or proteolytic enzymes and it contains mainly, lactose, proteins, minerals and water. Whey comprises of proteins such as β-lactoglobulin, α-lactalbumin and albumin as major whey proteins and lactoferrin, immunoglobulin and lactoperoxidase as minor whey proteins.

Because of their functional, biological and nutritional properties, whey proteins and processes for separating the same from whey are receiving an increased interest. Once the whey proteins are separated from whey, the remaining components such as lactose, minerals and water can also be utilized for the generation of other valuable products. Thus, lots of research is going on in this direction worldwide.

There are two predominant routes for separating whey proteins from whey namely, filtration based routes where different types of membranes are used and chromatographic fractionation based route where different types of ion exchange resins are used.

In relation to filtration based route for separating whey proteins from whey, reference may be made to U.S. Pat. No. 5,008,376 that discloses process for producing an α-lactalbumin-enhanced fraction from a liquid containing whey protein including α-lactalbumin and β-lactoglobulin which comprises subjecting said liquid to ultra-filtration using a membrane having a molecular weight cut off of about 100,000 to form a permeate having a protein content in which the proportion of α-lactalbumin is enhanced relative to the proportion obtaining in the protein content of said liquid and further ultra-filtering said permeate using a membrane having a molecular weight cut off up to 10,000 to produce a concentrate having an enhanced α-lactalbumin content.

Further reference may be made to Mexican Patent number MX 2007016089 that discloses a process based on aqueous two-phase systems and ultrafiltration for the fractionation and recovery of whey protein from bovine cattle.

Further reference may be made to U.S. Pat. No. 6,827,960 that disclosed a microfiltration based method of milk separation, comprising separating milk by cross-flow membrane filtration to recover at least one nutraceutical milk product therefrom, wherein said method does not include recirculation of any chromatography resins in cross-flow filter.

Further reference may be made to Chinese Patent number CN 101926408 that discloses a production method and a device of casein and whey protein, in particular to a method and a device for producing casein and whey protein by adopting a ceramic membrane microfiltration system to separate milk. The method comprises the following steps of: pre-filtering milk; then, raising the temperature for centrifugalizing cream to obtain skim milk; pasteurizing and cooling the skim milk and entering the ceramic membrane microfiltration system; and selecting different concentration factors according to product brands, enriching trapped fluid to form casein and enriching permeate liquid to form whey protein. The separation method of the invention has the advantages of simple operation, continuous production and convenient cleaning; and the obtained casein can be directly compounded with the cream for processing and producing cheese and providing a new path for the standardized process of cream for cheese. Meanwhile, the obtained ideal whey is sterile and fat-free, has uniform contents and easy control and simplifies the process for processing the whey into a whey product with a high added value.

Unfortunately, the filtration based routes have certain disadvantages. Firstly, the whey proteins produced by the use of filtration techniques has high amount of lipids and lactose content. Because of the presence of high amount of lipids and lactose, the product is referred to as Whey Protein Concentrate (WPC) that has limited use. Secondly, the use of filtration techniques has its inherent problem of fouling (Saxena, A. et. al., Adv. in Colloid and Interface Sci., 145,2009,1), that not only enhances the operational cost. Thirdly, the filtration techniques also fail to achieve selective separation of proteins form whey as the membrane separation is a size based separation, therefore it becomes almost difficult to achieve selective separation of proteins from whey.

In relation to chromatographic fractionation based route for separating whey proteins from whey, reference may be made to U.S. Pat. No. 5,077,067 that discloses a process for the selective and quantitative removal of lactoglobulin from a starting material containing whey proteins using commercially available anion exchanger.

Further reference may be made to U.S. Pat. No. 5,055,558 that describes a method for the selective extraction of beta-lactoglobulin from whey or milk using an ion exchange resin comprising of chemically activated polymeric matrix selected from the group consisting of acrylic resins and polysaccharides including commercially available ion exchange resin.

Further reference may be made to U.S. Pat. No. 3,969,337, that discloses a process for the chromatographic fractionation of dairy whey containing lactose, proteins and mineral salts into a protein fraction comprising passing said whey through a column of a cation exchange material in neutral form, said cation exchange material comprising a polystyrene resin containing sulfonic acid groups, thereafter passing an aqueous eluent consisting essentially of water through said column, and collecting a plurality of sequential aqueous effluents from said column as a plurality of separate fractions.

Further reference may be made to U.S. Pat. No. 6,096,870 that discloses a method for the sequential separation of whey proteins, comprising the steps of (a) providing (i) a cationic exchange resin contained within a container; (ii) a whey sample, wherein said whey sample comprises at least one whey protein selected from the group consisting of immunoglobulin, β-lactoglobulin, α-lactalbumin, lactoperoxidase, serum albumin, and lactoferrin; and (iii) a cationic exchange resin; (b) passing said whey sample through said resin under conditions whereby said whey proteins adsorb to said resin; (c) collecting the flow-through from said cationic exchange resin, wherein said flow-through comprises lactose, minerals, lactic acid, and non-nitrogenous components; (d) sequentially eluting said immunoglobulin and said β-lactoglobulin from said cationic exchange resin; (e) eluting said a-lactalbumin from cationic exchange resin; (f) eluting said serum albumin from cationic exchange resin; (g) eluting said lactoferrin from said cationic exchange resin; and (h) eluting said lactoperoxidase from said cationic exchange resin.

Further reference may be made to Japanese Patent Application Publication number JP 2010193833 A that discloses a method for separating and recovering whey protein, comprising the following steps: (A) passing a part of whey protein through a porous membrane having an anion exchange group to obtain a permeate having lactoferrin; (B) eluting the porous membrane having the anion exchange group with a salt solution to obtain an elute containing α-lactalbumin and β-lactoglobulin; (C) passing the elute of step (B) through a porous membrane having hydrophobic group to obtain a permeate having α-lactalbumin; and (D) eluting the porous membrane having the hydrophobic group with a salt solution to obtain an elute containing β-lactoglobulin.

Further reference may be made to Howell, J. et. al., Proceedings of the ADPUCDR Conference, Chicago, Ill., 1990, pp. 43-59 that describes producing whey protein isolate by adsorption of whey proteins onto ion-exchange beads.

The chromatographic fractionation based routes overcomes the disadvantage associated with filtration based routes in terms of quality of the proteins produced. In particular, the proteins produced by use of chromatographic fractionation based routes do not have high amount of lipid and lactose and are therefore referred to as Whey protein Isolate (WPI).

However, there are certain disadvantages in following the chromatographic fractionation based routes. The resolution and throughput of conventional chromatographic methods such as stirred tanks and packed axial columns is too low to be economical. This is especially true because the whey proteins are present in small quantities and to recover a fixed amount of protein, large volumes of solution has to be processed. Furthermore, in chromatographic separation having packed bed columns the throughput is limited by either slow intra-bead diffusion (if the packed bed comprises large beads) or slow liquid drainage rate and high column pressure drops for (if the packed bed comprises small beads) thereby making the chromatographic process uneconomical. It may be possible to achieve high throughput selectivity if a monolithic ion-exchange media in a column configuration (as demonstrated in U.S. Pat. No. 6,096,870, referenced above) is used (instead of using a packed bed configuration). However, the cost of preparation of monolithic ion-exchange media in the form of sheet containing ion exchange group and the cost of maintenance appears to be substantially high (for large scale operations).

Instead of using either one of the chromatographic fractionation based route or the filtration based route, PCT Publication number WO 2010023361 A2 describes a method for the separation of milk components, wherein proteins, sugars and minerals are separated into different fractions using different techniques such as hydrolysis, nano-filtration and chromatography, membrane, and/or evaporation. However, separation of whey proteins by adopting a multi-step process severely affects their economic viability at commercial level.

Thus, it can be seen that despite the extensive amount of research going on worldwide in the area of separating whey proteins from whey (or a source containing whey proteins), there is still a need to provide improved process. In particular, it is desirable to provide a method for the separation of whey proteins in a simple one or two separation process to achieve desirable purity of protein that can be easily, economically, and efficiently utilized as a supplement for commercially important products.

SUMMARY OF THE INVENTION

Accordingly, the present invention provides a system for separating whey proteins from whey, the system being constructed to implement a combination of chromatography and membrane filtration technique. The present invention furthermore provides a method for separating whey proteins from whey, by implementing a combination of chromatography and membrane filtration technique. In an embodiment, the whey protein thus separated is in form of whey protein isolate.

To further clarify advantages and features of the present invention, a more particular description of the invention will be rendered by reference to specific embodiments thereof, which is illustrated in the appended figures. It is appreciated that these figures depict only typical embodiments of the invention and are therefore not to be considered limiting of its scope. The invention will be described and explained with additional specificity and detail with the accompanying figures.

BRIEF DESCRIPTION OF FIGURES

These and other features, aspects, and advantages of the present invention will become better understood when the following detailed description is read with reference to the accompanying figures in which like characters represent like parts throughout the figures, wherein.

Further, skilled artisans will appreciate that elements in the figures are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having benefit of the description herein.

DETAILED DESCRIPTION

For the purpose of promoting an understanding of the principles of the invention, reference will now be made to the embodiment illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying figures.

As used herein, the term "whey" is used in reference to the liquid portion of curdled milk. It is not limited to any particular type of whey (e.g., sweet whey or acid whey), any particular type of milk (e.g., cow milk, sheep milk, goat milk, etc.). It is also not limited to any particular milk fat content. However, the term excludes deproteinized whey or whey that has been significantly modified in any manner.

The term "single process step" is used in the present invention means a separation process commonly used in chromatography comprises of equilibration, adsorption, washing, elution, and regeneration to start next cycle of separation.

As used herein, the term "cotton cloth" is used in reference to porous material (e.g., fabric, fibre, sheet, etc.) made out of cellulose (e.g., regenerated cellulose, derivative of cellulose, etc.) an organic compound of vegetable, synthetic, or other origin.

As used herein, the term "filtration unit" is used in reference to a device that comprises a porous filter element across a surface of which the liquid medium to be filtered is flowed in a tangential flow fashion, for permeation through the filter element of selected component(s) of the liquid medium.

The term "porous filter" is used in the present invention means a modified cotton cloth.

The term "plate/stack/module" is used in the present invention means an operative stacked arrangement of a porous filter that used as per the need of respective membrane filtration device configurations.

As used herein, the term "flow rate" is used in reference to the speed at which a fluid or liquid (e.g., whey, buffer, water, etc.) passes through the porous filter packed in a membrane filtration device.

The term "equilibration buffer" is used in the present invention means a fluid that equilibrate the porous filter as to prepare it for adsorption and also refer to the washing to remove the un-adsorbed material after the adsorption. While the Applicant has provided some examples of buffer, the invention is not restricted to such examples of the buffer.

As used herein, the term "elution buffer" or "eluent" is used in reference to the fluid that removes adsorbed material from the porous filter.

The term "acid pH" is used in the present invention means a pH 3.5 to pH 6.5 (±0.2).

As used herein, the term "neutral pH" is used in reference to the pH 7.0 (±0.2).

The term "basic pH" is used in the present invention means a pH 7.0 to pH 9.0 (±0.2).

As used herein, the term "dilute HCl" is used in reference to the 0.1 N HCl.

The present invention is a means for an economical production of whey proteins at large-scale level, more precisely for an economical production of whey protein isolate (WPI) at large-scale level using combination of chromatography and membrane filtration technique.

Figure 1:
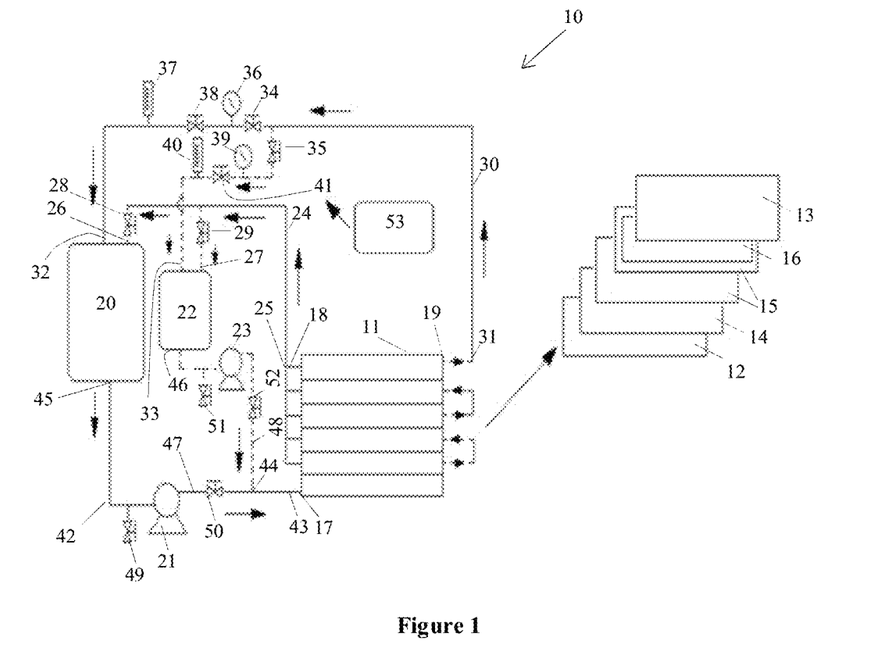
FIG. 1 illustrates a block diagram of a system for separating whey proteins from whey in accordance with an embodiment of the invention.

Referring to FIG. 1, the invention provides a system (10) for separating for separating whey proteins from whey. The system (10) comprises a filtration unit (11) comprising a bottom plate (12) at a first extremity, a top plate (13) at a second extremity opposite to the first extremity, a permeate spacer (14) placed proximate to and in spaced apart relation with respect to the bottom plate (12), at least one porous filter (15) placed proximate to and in spaced apart relation with respect to the permeate spacer (13) and a gasket (16) provided between the porous filter (15) and the top plate (13). The filtration unit further defines an input port (17), a permeate port (18) and a retentate port (19). The porous filter comprises cotton cloth having an ion exchange element deposited thereupon.

The system (10) further comprises a feed storage unit (20) connected to the input port (17) of the filtration unit via a first pump (21) and an eluent storage unit (22) connected to the input port (17) of the filtration unit via a second pump (23).

The system (10) further comprises a first set of tubing (24) comprising an input end (25), a first output end (26), a second end (27), a first valve (28) for controlling an amount of fluid flowing out of the first output end (26) and a second valve (29) for controlling an amount of fluid flowing out of the second output end (27), the input end being (25) connected to the permeate port (18), the first output end (26) being connected to the feed storage unit (20) and the second output end (27) being connected to the eluent storage unit (22).

The system (10) further comprises a second set of tubing (30) comprising a input end (31), a first output end (32), a second end (33), a first valve (34) for controlling an amount of fluid flowing out of the first output end (32) and a second valve (35) for controlling an amount of fluid flowing out of the second output end (33), the input end (31) being connected to the retentate port (19), the first output end (32) being connected to the feed storage unit (20) and the second output end (33) being connected to the eluent storage unit (22).

In an embodiment of the invention, the second set of tubing (30) further comprises: a first pressure sensor (36) located between the first valve (34) and the first output end (32); a first flow rate sensor (37) located between the first pressure sensor (36) and the first output end (32); a third valve (38) located between the first flow rate sensor (36) and the first pressure sensor (37); a second pressure sensor (39) located between the second valve (35) and the second output end (33); a second flow rate sensor (40) located between the second pressure sensor (39) and the second output end (33); and a fourth valve (41) located between the second flow rate sensor (40) and the second pressure sensor (39).

The system (10) further comprises a third tubing set (44) connecting the feed storage unit (20) to the input port (17) of the filtration unit (11) via the first pump (21) and connecting the eluent storage unit (22) connected to the input port (17) of the filtration unit (11) via the second pump (22).

In an embodiment of the invention, the third tubing set (42) comprises: an output end (43) connected to the filtration unit (11); an intermediate portion (44); a first input end (45) connected to the feed storage unit (20); a second input end (46) connected to the eluent storage unit (22); a first input section (47) located between the intermediate portion (44) and the first input end (45) and accommodating the first pump (21); and a second input section (48) located between the intermediate portion (44) and the second input end (46) and accommodating the second pump (23).

In another embodiment, the third tubing (42) further comprises a first control valve (49) located between the feed storage unit (20) and the first pump (21); a second control valve (50) located between the first pump (21) and the intermediate portion (44); a third control valve (51) located between the eluent storage unit (22) and the second pump (23); and a fourth control valve (52) located between the second pump (23) and the intermediate portion (44).

The system (10) further comprises a control unit (53) adapted to control operation of the first pump (21) and the second pump (23).

In an embodiment of the invention, the control unit (53) is further adapted to control operation of the first valve (28) forming part of the first tubing set (24); the second valve (29) forming part of the first tubing set (24); the first valve (34) forming part of the second tubing set (30); the second valve (35) forming part of the second tubing set (30); the third valve (38) forming part of the second tubing set (30); the fourth valve (41) forming part of the second tubing set (30); the first control valve (49) forming part of the third tubing set (42); the second control valve (50) forming part of the third tubing set (42); the third control valve (51) forming part of the third tubing set (42); and the fourth control valve (52) forming part of the third tubing set (42) such that during operation of the first pump (21), the third control valve (51) forming part of the third tubing set (42); and the fourth control valve (52) forming part of the third tubing set (42); the second valve (29) forming part of the first tubing set (24); the second valve (35) forming part of the second tubing set (30); and the fourth valve (41) forming part of the second tubing set (30) are maintained in a closed state.

In another embodiment, during operation of the first pump (21), the control unit (53) is further adapted control the first control valve (49) forming part of the third tubing set (42); the second control valve (50) forming part of the third tubing set (42); the first valve (28) forming part of the first tubing set (24); the first valve (34) forming part of the second tubing set (30); and the third valve (38) forming part of the second tubing set (30) so as to be in any one of an open state or a closed state.

In yet another embodiment, during operation of the second pump (23), the control unit (53) is further adapted to control the first control valve (49) forming part of the third tubing set (42); the second control valve (50) forming part of the third tubing set (42); the first valve (28) forming part of the first tubing set (24); the first valve (34) forming part of the second tubing set (30); and the third valve (38) forming part of the second tubing set (30) so as to be maintained in a closed state.

In still another embodiment, during operation of the second pump (23), the control unit (53) is further adapted to control the third control valve (51) forming part of the third tubing set (42); and the fourth control valve (52) forming part of the third tubing set (42); the second valve (29) forming part of the first tubing set (24); the second valve (35) forming part of the second tubing set (30); and the fourth valve (41) forming part of the second tubing set (30) so as to be in any one of an open state or a closed state.

In an embodiment of the invention, the first pump has a first speed and the second pump has a second speed, with the second speed being lesser than the first speed.

The present invention furthermore provides a process for separating for separating whey proteins, comprising the steps of:
 (a) providing a system comprising:
  a filtration unit (11) comprising a bottom plate (12) at a first extremity, a top plate (13) at a second extremity opposite to the first extremity, a permeate spacer (14) placed proximate to and in spaced apart relation with respect to the bottom plate (12), at least one porous filter (15) placed proximate to and in spaced apart relation with respect to the permeate spacer (13) and a gasket (16) provided between the porous filter (15) and the top plate (13); the filtration unit defining an input port (17), a permeate port (18) and a retentate port (19); the porous filter comprising cotton cloth having an ion exchange element deposited thereupon;
  a feed storage unit (20) connected to the input port (17) of the filtration unit via a first pump (21);
  an eluent storage unit (22) connected to the input port (17) of the filtration unit via a second pump (22);
  a first set of tubing (24) comprising an input end (25), a first output end (26), a second end (27), a first valve (28) for controlling an amount of fluid flowing out of the first output end (26) and a second valve (29) for controlling an amount of fluid flowing out of the second output end (27), the input end being (25) connected to the permeate port (18), the first output end (26) being connected to the feed storage unit (20) and the second output end (27) being connected to the eluent storage unit (22); and a second set of tubing (30) comprising a input end (31), a first output end (32), a second end (33), a first valve (34) for controlling an amount of fluid flowing out of the first output end (32) and a second valve (35) for controlling an amount of fluid flowing out of the second output end (33), the input end (31) being connected to the retentate port (19), the first output end (32) being connected to the feed storage unit (20) and the second output end (33) being connected to the eluent storage unit (22);

(b) passing an equilibration buffer through the filtration unit (11) to equilibrate the porous filter (15);

(c) passing a source of whey protein through the filtration unit (11) to allow whey proteins to be adsorbed on the porous filter;

(d) washing the filtration unit (11); and (e) passing an eluent solution through the filtration unit (11) to obtain the whey proteins.

In an embodiment of the invention, the steps of passing the equilibration buffer through the filtration unit (11); passing the source of whey protein through the filtration unit (11); and washing the filtration unit (11), are performed using the first pump operating at a first speed and the step of passing the eluent solution through the filtration unit is performed using the second pump operating at a second speed, with the second speed being lesser than the first speed.

In an embodiment of the invention, the step of providing the filtration unit (11) further comprises providing a cotton cloth having an ion exchange element deposited thereupon as the porous filter within the filtration unit.

In an embodiment of the invention, the step of providing the cotton cloth having an ion exchange element deposited thereupon comprises:

treating a cotton cloth with a mixture of chlorosulphonic acid and chloroform to obtain a first stage treated cloth;
treating the first stage treated cloth thus obtained with chloroform to obtain a second stage treated cloth;
treating the second stage treated cloth thus obtained with a solution comprising sodium hydroxide to obtain a third stage treated cloth;
treating the third stage treated cloth thus obtained with glycine to obtain a fourth stage treated cloth; and
washing the fourth stage treated cloth thus obtained with water to obtain the cotton cloth having an ion exchange element deposited thereupon.

In an embodiment of the invention, in response passing an equilibration buffer through the filtration unit (11) to equilibrate the porous filter (15), a first permeate portion and a first retentate portion are obtained, wherein the control unit operates the valves provided in the system to combine the first permeate portion with the first retentate portion.

In an embodiment of the invention, in response passing the source of whey protein through the filtration unit (11), a second permeate portion and a second retentate portion are obtained, wherein the control unit operates the valves provided in the system to combine the second permeate portion with the second retentate portion.

In an embodiment of the invention, in response to washing the filtration unit (11), a permeate wash portion and a retentate wash portion are obtained, wherein the control unit operates the valves provided in the system to combine the permeate wash portion with the retentate wash portion.

In an embodiment of the invention, in response passing the eluent solution through the filtration unit (11), a permeate eluent portion and a retentate eluent portion are obtained, wherein the control unit operates the valves provided in the system to combine the permeate eluent portion with the retentate eluent portion and directs the same towards the eluent storage unit (22).

In an embodiment of the invention, the method further comprises regenerating the porous filter contained in the filtration unit.

While the invention is hereinafter described with reference to some preferred embodiments, it may be noted that the subject matter of the preferred embodiments are intended to restrict the scope the claims in any manner.

The present invention is a means for an economical production of whey proteins at large-scale level, more precisely for an economical production of whey protein isolate (WPI) at large-scale level using combination of chromatography and membrane filtration technique.

The novelty of the present invention is based on its uniqueness in the combination of ion exchange chromatography and membrane filtration device equipped with modified flow pattern to obtain whey proteins in a single process step in concentrated form that can be directly used for freeze drying, spray drying, etc. The present invention developed combination of chromatography and membrane filtration technique to overcome their conventional problems. In the present invention, the use of cotton cloth ensures higher pore size, which means low fouling and high throughput, and low preparation and maintenance cost in comparison with the available commercial polymeric membranes or chromatography adsorbent media. Secondly, the use of membrane filtration device equipped with modified flow pattern to obtain whey proteins in a single process step in concentrated form enhances further the overall economical viability of present invention at commercial-scale operation.

Accordingly, the present invention comprises a single step process for obtaining Whey protein isolate (WPI) comprising:

Filtering whey through a cloth treated to possess positive or negative charge to obtain the desire product.

In an embodiment, the cloth is selected from cotton cloth. Cotton cloth refers to porous material (e.g., fabric, fiber, sheet, etc.) made out of cellulose (e.g., regenerated cellulose, derivative of cellulose, etc.) an organic compound of vegetable, synthetic, or other origin.

In another embodiment of the invention, the treatment of the cloth comprises chloroform, which was used to solubilize the chlorosulphonic acid and also for the washing of treated cotton cloth using a mixture of chlorosulphonic acid and chloroform, further treated cotton cloth was washed with dilute NaOH (eg. 0.1 M-2.0 M) and water (RO) followed by glycine treatment to block the unreacted groups and again washed with water (RO) and used as modified cotton cloth for the verification of its reusability.

Comparative examples were evolved with untreated cloth, with different treatments, and the WPI obtained with the different treatments were compared.

The development of present invention further involved verification of scale-up capability and the modification of flow pattern of membrane filtration device to obtain whey proteins in a single process step in concentrated form (FIG. 1). The modification of flow pattern comprises the outflow as retentate that coming through the modified cotton cloth fixed in a plate/stack/module of membrane filtration device depends on the configuration in used connected to the another plate/stack/module as feed and likewise to enhance the adsorption. The modification of flow pattern also comprises the connection of outflow as retentate, permeate to the feed tank using on/off valve to carry out operation such as equilibration, adsorption, elution, washing and regeneration in recirculation mode to achieve optimum performance with minimum material that require to perform such operations. The modification of flow pattern further comprises of two pumps one with high flow rate to achieve optimum performance of operations such as equilibration, adsorption, washing and regeneration and another pump with low flow rate for elution to obtain whey proteins in concentrated form.

The cloth varieties procured from the market were studied for their use as the cloth to be treated for using for the process of the invention to obtain WPI. The effect on the quality and variety of cloth was studied and is depicted trough FIGS. 2, 3 and 6.

Figure 7:
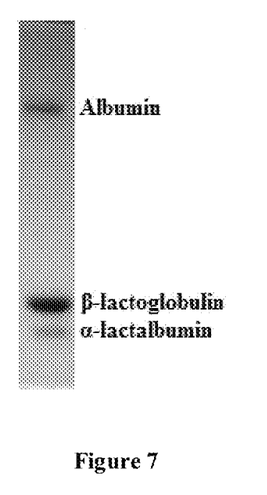
FIG. 7 is a picture showing verification of product obtained as elution using sodium dodecyl sulfate polyacrylamide gel electrophoresis (SDS-PAGE)
Figure 8:
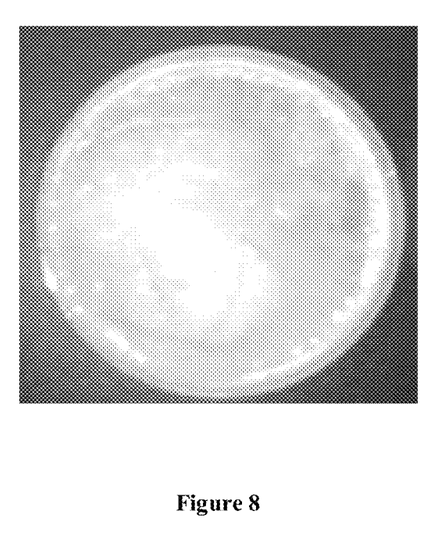
FIG. 8 is a picture showing a petri plate containing the freeze dried product obtained as elution ion accordance with the teachings of the present invention.

The development of present invention furthermore involved verification of eluted material as whey proteins by using sodium dodecyl sulfate polyacrylamide gel electrophoresis (SDS-PAGE), refer FIGS. 7 and 8.

Figure 5:
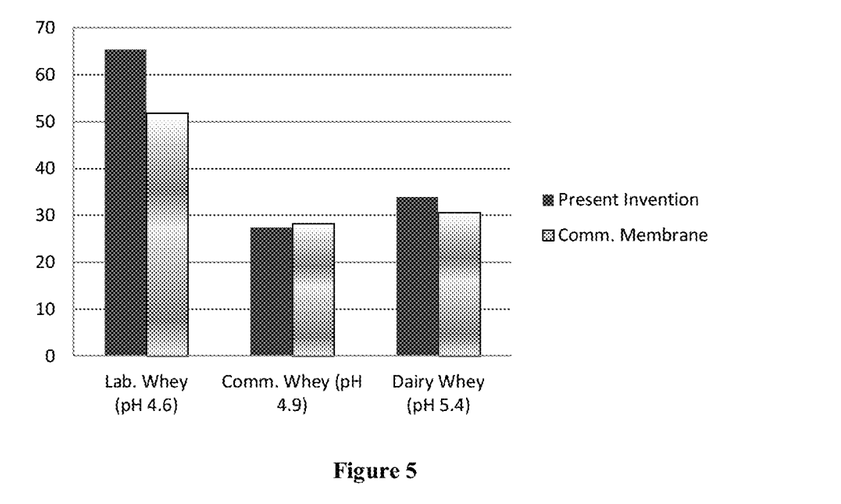
FIG. 5 is a graph illustrating the effect of whey source on the adsorption of modified cotton cloth and commercial membrane.

The process of separation described herein was compared with marketed product used for the separation and is represented herein in FIG. 5.

Figure 4:
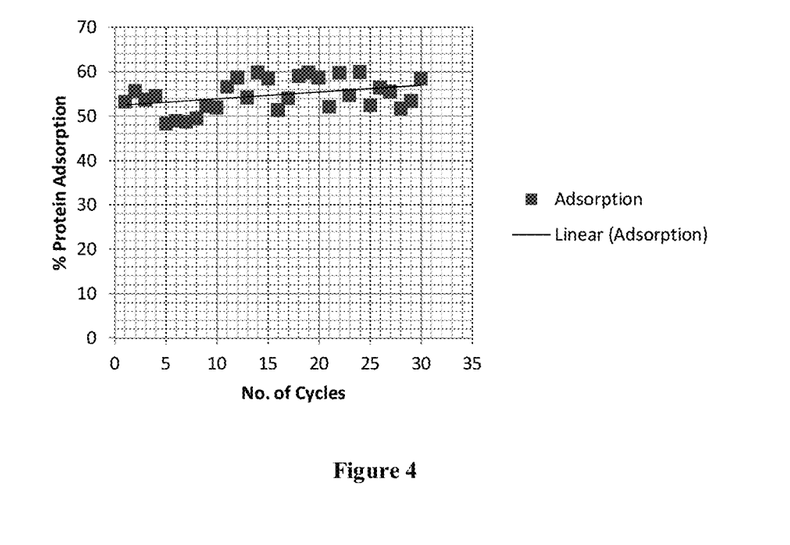
FIG. 4 is a graph illustrating the relationship between level of protein adsorption and number of regeneration cycles to which the cotton cloth has been subjected, thereby illustrating the re-usability of the cotton cloth.

In an embodiment, the cloth used for the separating process of whey is recyclable. Referring to FIG. 4, it is observed that the cloth retains its properties to maintain flux and does not show fouling over at least 30 cycles.

Accordingly the present invention provides a membrane filtration device equipped with modified flow pattern useful for obtaining proteins in concentrated forms. The invention further provides a method for the production of whey proteins in a single step process using combination of chromatography and membrane filtration technique, comprising treating cotton cloth with a mixture of chlorosulphonic acid and chloroform and then subsequently treating it with chloroform, dilute NaOH, glycine and water to recover modified cotton cloth as the product, thereafter fixing product in a membrane filtration device equipped with modified flow pattern and then equilibrating it with equilibration buffer, followed by loading of whey for adsorption of protein on the product and washing of the product with equilibration buffer, thereafter elution of adsorbed proteins with elution buffer, and then regeneration of the product by treating it with dilute 2 HCl and water to reuse the product.

In an embodiment of the present invention, it provides a membrane filtration device equipped with modified flow pattern useful for obtaining proteins in concentrated forms comprising of:
  a. Path of conventional flow pattern where the feed (whey) stored in Feed Tank (SS) flow through HDPE/PP tubing by High flow rate pump (200 ml/min to 1000 ml/min) to the Plate/Stack/Module comprising of Bottom plate (SS 316); Permeate spacer; Porous filter (Modified Cotton Cloth); Gasket; and Top plate (SS 316); then the stream coming out of this as Retentate goes back to the Feed Tank through Valve; Pressure gauge; and Flow meter; for recirculation and another stream coming out as Permeate is mixed with the Retentate through a valve for recirculation and,
  b. Path of modified flow pattern where the eluent stored in Eluent tank (SS) flow through HDPE/PP tubing by Low flow rate pump (40 ml/min to 200 ml/min) to the Plate/Stack/Module comprising of Bottom plate; Permeate spacer; Porous filter having a cotton cloth treated with 10%-30% (v/v) chlorosulphonic acid (CSA), chloroform (Chilled; Commercial grade), dilute NaOH (0.1-0.5 N), glycine (0.2 M) and water (RO); a Gasket; and a Top plate; then the stream coming out of this as Retentate goes back to Eluent tank through a Valve; a Pressure gauge; a Flow meter; for recirculation and another stream coming out as Permeate is connected to Retentate through a Valve for recirculation.

In another embodiment of the present invention, it provides a process for obtaining whey protein using the device comprising of the following steps:
  a) Providing cotton cloth;
  b) Treating the cloth with 10%-30% (v/v) chlorosulphonic acid (CSA) and chloroform (Chilled; Commercial grade) and then subsequently treating it with chloroform (Chilled; Commercial grade), dilute NaOH (0.1-0.5 N Sodium hydroxide), glycine (0.2 M) and water (Reverse osmosis) to recover modified cotton cloth.
  c) Cutting the cloth obtained in step (b) in to sheet and fixed in the membrane filtration device equipped with modified flow pattern.
  d) Passing the equilibration buffer (25-50 mM Citrate/Phosphate buffer pH 4.0-6.5) through the membrane filtration device equipped with modified flow pattern obtained in step (c) to equilibrate the modified cotton cloth for adsorption of whey proteins;
  e) Providing whey;
  f) Passing the whey through the membrane filtration device equipped with modified flow pattern obtained in step (d) to obtain adsorbed whey proteins;
  g) washing the unadsorbed whey proteins obtained in step (f) with equilibration buffer (25-50 mM Citrate/Phosphate buffer pH 4.0-6.5),
  h) eluting the adsorbed proteins obtained in step (f) with elution buffer (100-200 mM Phosphate/Tris (Tris-(hydroxymethyl)aminomethane) buffer pH 7.0-9.0) to obtain whey proteins;
  i) regenerating the modified cotton cloth by treating it with dilute HCl (0.1 N Hydrochloric acid) and water (Reverse osmosis) to start next cycle of whey protein separation.

In an embodiment of the present invention, the cotton cloth may be of any source available in the market, preferably the cotton cloth that sustains chemical treatment.

In one embodiment of the present invention, the cotton cloth may be treated with a chemical that gives the cotton cloth negative or positive charge.

In another embodiment of the present invention, the cotton cloth may be treated with acid selected from chloroacetic acid and chlorosulphonic acid that impart negative charge or 2-chloro-N, N-diethylethylamine hydrochloride or N-(3-chloro-2-hydroxyproply) trimethylammonuim chloride that impart positive charge.

In a preferred embodiment, the cotton cloth is treated with chlorosulphonic acid that imparts negative charge.

In yet another embodiment of the present invention, the concentration of chlorosulphonic acid in a mixture of chlorosulphonic acid and chloroform may be 5% to 30%.

In still another embodiment of the present invention, the membrane filtration device equipped with modified flow pattern may be of any configuration available in the market, preferably membrane filtration device comprising of one pump with high flow rate and another pump with low flow rate. The pump is characterized by high flow rate and low flow rate and is established by the inventors, using modified the flow pattern during the process.

In one more embodiment of the present invention, the permeate flow and retentate flow of membrane filtration device may be connected with feed tank by an on/off valve.

In yet one more embodiment of the present invention, the retentate of one plate/stack/module of membrane filtration device may be feed of another plate/stack/module of membrane filtration device and likewise.

In still one more embodiment of the present invention, the flow pattern of membrane filtration device may be in recirculation mode for operations such as equilibration, adsorption, elution, washing and regeneration.

In one more embodiment of the present invention, the recirculation flow rate of membrane filtration device may be different for different operations such as equilibration, adsorption, elution, washing and regeneration.

In yet one another embodiment of the present invention, the pH of equilibration buffer may be acid pH and the pH of elution buffer may be neutral pH and/or basic pH.

EXAMPLES

The following examples are given by way of illustration of the present invention and therefore should not be construed to limit the scope of the present invention.

Example 1

Figure 2:
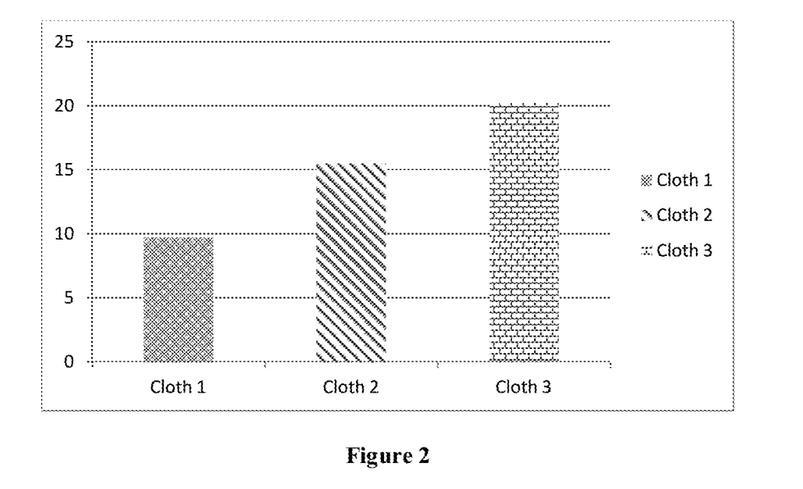
FIG. 2 is a graph depicting efficiencies of different types of cloths for whey protein adsorption.

Three different type of cloth [Cloth 1: Polyester cloth white color; Cloth 2: Cotton cloth white color; Cloth 3: Silk cloth cream color (South India)], were obtained from the local market and prior to use all were washed with detergent that commonly used in household for the washing of cloth. The cloth used as porous filter and was cut in to circle and fixed in the Amicon® Stirred Cell having active surface are of 13.4 cm$^2$ to check the whey protein adsorption. The whey was prepared using commercially available packaged pasteurized and toned milk. The pH of milk was adjusted to 4.5 using 2.0 N HCl and maintained at this pH for 1.0 hour (h). The milk was then warmed to 40° C. for 10 minutes to settle the precipitated casein. The whey was filtered through muslin cloth and centrifuged at 4000 rpm for 30 min for getting a clear liquid and used it as whey. Equilibration was done by stirring 5.0 ml equilibration buffer (25 mM Citrate-Phosphate buffer pH 4.6) for 5.0 min at 0 pressures and outlet was closed. After 5.0 min it was drain out at 0.5 bar pressure by opening the outlet, this was consecutively done three times. After equilibration 5.0 ml whey was loaded as feed and allows it to stirrer for 30 min at 0 pressures and outlet was closed. After 30 min it was drain out at 0.5 bar pressure by opening the outlet and collected as permeate. Thereafter washing was carried out by stirring 5.0 ml equilibration buffer (25 mM Citrate-Phosphate buffer pH 4.6) for 5.0 min at 0 pressures and outlet was closed. After 5.0 min it was drain out at 0.5 bar pressure by opening the outlet, this was consecutively done three times and collected as washings. Then elution was carried out by stirring 5.0 ml elution buffer (100 mM Phosphate buffer pH 7.0) for 15.0 min at 0 pressures and outlet was closed. After 15.0 min it was drain out at 0.5 bar pressure by opening the outlet, and collected as elution. The sample collected as feed, permeate and elution was analyzed to estimate the concentration of protein using Lowry's method (Lowry O H, J. Biol. Chem. 193, 1951, 265). The results obtained are shown in FIG. 2.

The cloth that shows adsorption capacity above 10.0% was selected to test their chemical stability with different chemicals that impart negative or positive charge to cloth.

Example 2

Two different type of cloth [Cloth 2: Cotton cloth white color; Cloth 3: Silk cloth cream color (South India)], selected for the chemical stability test. All the selected cloth were cut in to circle (~13.4 cm$^2$) and allowed to react with different concentration of chlorosulphonic acid (5.0% to 30.0% v/v) prepared in chilled chloroform under mild shaking and allowed to react for 1.0 h and check their physical appearance. All the cloth got tear off very fast at the concentration of 30.0% and 20.0% v/v. However, Cloth 2 showed better physical appearance at 5.0% v/v and 10.0% v/v concentration in comparison to the Cloth 3. Cloth 2 was selected for the further study.

Example 3

Cloth 2 was treated with 2-chloro-N, N-diethylethylamine hydrochloride (DEAE), N-(3-chloro-2-hydroxyproply) trimethylammonuim chloride (CHMAC) that imparts positive charge and it was treated with chloroacetic acid (CA), chlorosulphonic acid (CSA) that imparts negative charge as follows:

DEAE Treatment

Figure 3:
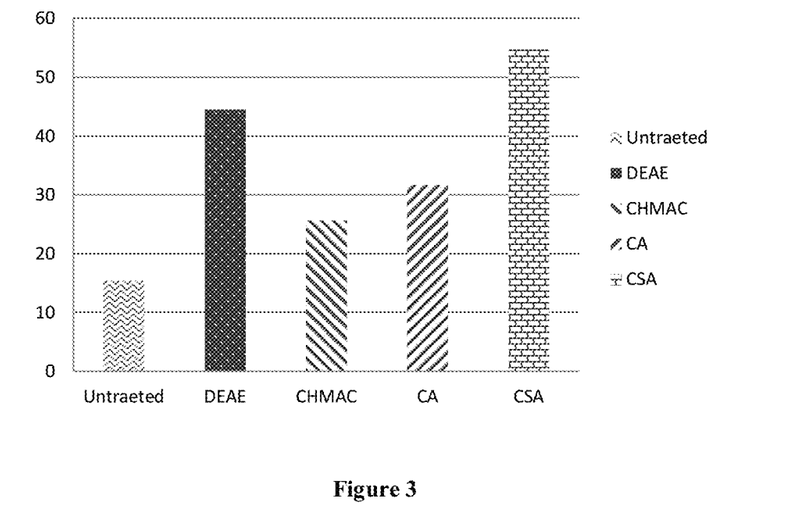
FIG. 3 is a graph depicting efficiencies of whey protein adsorption by cotton cloth treated with different type of chemicals.

Cloth 2 was cut in to circle (~13.4 cm$^2$) and three circles were allowed to react with 75.0 ml of 1.0 M DEAE prepared in 2.0 N NaOH (wt/v) at 60° C. for 2 h under mild stirring. Circles were washed with water (RO) and treated with glycine. The glycine treatment was given by using 10.0 ml glycine solution (0.1 M glycine prepared in 0.1 M NaOH) and allows it react at mild stirring for 2.0 h and then washed with water. After glycine treatment and water washing, the three circles were fixed in the Amicon® Stirred Cell to study the adsorption. The basic method for stirred cell operation was followed to evaluate whey protein adsorption (Example 1) otherwise stated herein. The pH of the feed (whey) was adjusted to pH 7.0 using 2.0 N NaOH prior to loading. The equilibration and washing was done using 25 mM phosphate buffer pH 7.0 and elution was carried out with 100 mM acetate buffer pH 5.0. The sample collected as feed, permeate and elution was analyzed to estimate the concentration of protein using Lowry's method. The results obtained are shown in FIG. 3.

CHMAC Treatment

Cloth 2 was cut in to circle (~13.4 cm$^2$) and three circles were allowed to react with 100.0 ml of 1.0 M CHMAC prepared in 2.0 N NaOH (v/v) at room temp (28±2° C.) for 16 h under mild stirring. After glycine treatment and water washing, the three circles were fixed in the Amicon® Stirred Cell to study the adsorption. The basic method for stirred cell operation was followed to evaluate whey protein adsorption (Example 1) otherwise stated herein. The pH of the feed (whey) was adjusted to pH 7.0 using 2.0N NaOH prior to loading. The equilibration and washing was done using 25 mM phosphate buffer pH 7.0 and elution was carried out with 100 mM acetate buffer pH 4.2. The sample collected as feed, permeate and elution was analyzed to estimate the concentration of protein using Lowry's method. The results obtained are shown in FIG. 3.

CA Treatment

Cloth 2 was cut in to circle (~13.4 cm$^2$) and three circles were allowed to react with 75.0 ml of 1.0 M CA prepared in 2.0N NaOH (wet/v) at room temp (28±2° C.) for 16 h under mild stirring. After glycine treatment and water washing, the three circles were fixed in the Amicon® Stirred Cell to study the adsorption. The basic method for stirred cell operation was followed to evaluate whey protein adsorption (Example 1) otherwise stated herein. The pH of the feed (whey) was adjusted to pH 4.2 using 2.0 N HCl prior to loading. The equilibration and washing was done using 25 mM citrate-phosphate buffer pH 4.2 and elution was carried out with 100 mM phosphate buffer pH 7.0. The sample collected as feed, permeate and elution was analyzed to estimate the concentration of protein using Lowry's method. The results obtained are shown in FIG. 3.

CSA Treatment

Cloth 2 was cut in to circle (~13.4 cm$^2$) and three circles were allowed to react with 20.0 ml of 10% (v/v) chlorosulphonic acid prepared in chilled chloroform under mild shaking and allowed to react for 1.0 h at room temp (28±2° C.). After 1.0 h the treated circles were removed and again treated with 10.0 ml chilled chloroform for 10.0 min. Thereafter, the treated circles were removed and again treated with 10.0 ml 0.5 N NaOH for 10 min. After glycine treatment and water washing, the three circles were fixed in the Amicon® Stirred Cell to study the adsorption. The basic method for stirred cell operation was followed to evaluate whey protein adsorption (Example 1) otherwise stated herein. The pH of the feed (whey) was not adjusted prior to loading. The equilibration and washing was done using 25 mM citrate-phosphate buffer pH 4.6 and elution was carried out with 100 mM phosphate buffer pH 7.0. The sample collected as feed, permeate and elution was analyzed to estimate the concentration of protein using Lowry's method. The results obtained are shown in FIG. 3.

No Treatment

Cloth 2 without any treatment was cut in to circle (~13.4 cm$^2$) and three circles were fixed in an Amicon® Stirred Cell to carry out blank run. The basic method for stirred cell operation was followed to evaluate whey protein adsorption (Example 1) otherwise stated herein. The pH of the feed (whey) was not adjusted prior to loading. The equilibration and washing was done using 25 mM citrate-phosphate buffer pH 5.0 and elution was carried out with 100 mM phosphate buffer pH 7.0. The sample collected as feed, permeate and elution was analyzed to estimate the concentration of protein using Lowry's method. The results obtained are shown in FIG. 3.

Comparatively, the CSA (chlorosulphonic acid) treated cloth had shown higher proteins adsorption capacity (FIG. 3). Thus, the CSA was selected as a chemical compound for the chemical modification of cloth for the further study. Cloth 2 treated with CSA termed as "modified cotton cloth" and used as "porous filter" in a membrane filtration device for the production of whey proteins.

Example 4

The reusability of modified cotton cloth as developed as per the method mentioned above (Example 3; CSA treatment) was studied to evaluate its suitability for commercial applications. The modified cotton cloth was cut in to circle (~13.4 cm$^2$) and three circles were fixed in an Amicon® Stirred Cell to study the effect number of cycles on whey proteins adsorption (FIG. 4). The basic method for stirred cell operation was followed to evaluate whey protein adsorption (Example 1) otherwise stated herein. The 4.0 ml whey was diluted to 10.0 ml using equilibration buffer (25 mM Citrate-Phosphate buffer pH 4.6) and 5.0 ml was used as feed to study the adsorption. The equilibration, adsorption, washing and elution was carried as mentioned in Example 1. The sample collected as feed, permeate and elution was analyzed to estimate the concentration of protein using Lowry's method. After the completion of each cycle, regeneration was carried out consecutively three times by recirculating 5.0 ml of 0.1N HCl for the period of 15.0 min. Thereafter, washing was carried out by recirculating consecutively three times 10.0 ml water for the period of 15.0 min prior to start next cycle.

FIG. 4 shows the whey protein adsorption obtained for 30 cycles. It was observed that the reusability of modified cotton cloth was excellent and it is very much suitable for commercial applications.

Example 5

Effect of whey source on the adsorption of modified cotton cloth of present invention and commercially available "stabilized reinforced cellulose" membrane containing sulfonic acid as a ligand termed as "Commercial Membrane" was studied to evaluate the suitability of present invention for commercial applications. The modified cotton cloth was cut in to circle (~13.4 cm$^2$) and three circles were fixed in an Amicon® Stirred Cell. However, one circle of commercial membrane was fixed in an Amicon® Stirred Cell to study the effect of whey source on the adsorption. The basic method for stirred cell operation was followed (Example 1) to evaluate whey protein adsorption otherwise stated herein. The three types of whey were used for the experiment such as Lab Whey; Comm. Whey; and Dairy Whey. The whey prepared as per the method mentioned in Example 1 was termed as "Lab Whey". The whey commercially available in a local market as a pouch that claimed to be suitable for human consumption was termed as "Comm. Whey". The whey obtained for the local dairy was termed as "Dairy Whey". All the three whey were used as it is without any pretreatment as feed to study the adsorption. The 5.0 ml feed was used to study the adsorption. The equilibration, adsorption, washing and elution were carried as mentioned in Example 1. The sample collected as feed, permeate and elution was analyzed to estimate the concentration of protein using Lowry's method.

FIG. 5 shows the whey protein adsorption obtained for different whey source for modified cotton cloth and "Commercial Membrane". Results indicate that the adsorption of whey protein varies as the source of whey varies. However, the whey protein adsorption pattern obtained for modified cotton cloth and "Comm. Membrane" was very much comparable. This suggests that the modified cotton cloth is very much suitable for commercial applications.

Example 6

The scale-up studies were carried out using membrane filtration device equipped with modified flow pattern as demonstrate in FIG. 1. The scale-up studied were carried out using feed volume 1000.0 ml, which correspond to 200 times higher than the feed volume (5.0 ml) used for the studies carried out using Amicon® Stirred Cell. The whey prepared in the lab (Example 1) was used as a feed with three different dilutions. The three cycles of operations was carried out using three different whey protein concentrations to study its effect on adsorption. The experiment was carried out by using modified cotton cloth as porous filter. The operations such as equilibration, adsorption and regeneration were carried out using high flow rate pump while keeping low flow rate pump and its flow path closed. Whereas, elution was carried out using low flow rate pump while keeping high flow rate pump and its flow path closed.

The modified cotton cloth was cut in to sheets and three sheets in each plate were fixed and such three plates were used for the experiment that corresponds to the total active surface area of 258.0 cm². Whey was diluted using equilibration buffer (25 mM Citrate-Phosphate buffer pH 4.6) to obtained three different concentrations and used as a feed. The equilibration was carried out by recirculating 1000.0 ml equilibration buffer for 1.0 h using high flow rate pump (200 ml/min) while keeping permeate flow connected to retentate flow. After 1.0 h the equilibration buffer was removed and adsorption was carried out by loading feed and recirculating it for 2.0 h using high flow rate pump (200 ml/min) while keeping permeate flow connected to retentate flow. Then unadsorbed material was removed and three consecutive washings were carried out using 300.0 ml equilibration buffer by recirculating it for 15.0 min using high flow rate pump (200 ml/min) while keeping permeate flow connected to retentate flow.

Thereafter, elution was carried out using 100.0 ml elution buffer (100 mM Phosphate buffer pH 7.0) as eluent by recirculating it for 2.0 h using low flow rate pump (55 ml/min) while keeping permeate flow connected to retentate flow. After 2.0 h eluent was removed and regeneration was carried out using 300.0 ml 0.1N HCl by recirculating it for 15.0 min using high flow rate pump (200 ml/min) while keeping permeate flow connected to retentate flow. The regeneration was carried out consecutively three times and then washing was carried out by recirculating consecutively three times 1000.0 ml water (RO) for the period of 15.0 min using high flow rate pump (200 ml/min) while keeping permeate flow connected to retentate flow. Then alternatively the 1000.0 ml of 0.05% sodium hypochlorite solution was recirculated for 15.0 min using high flow rate pump (200 ml/min) and for 15.0 min using low flow rate pump (55 ml/min) while keeping permeate flow connected to retentate flow and it allow to remain in the system by closing all the valve till next cycle. The sample collected as feed, permeate and elution was analyzed to estimate the concentration of protein using Lowry's method. The results obtained are shown in FIG. 6.

The next cycle was carried out after removing the sodium hypochlorite solution from the system and then washing it with by recirculating 1000.0 ml water (RO) consecutively three times using high and low flow rate pump alternatively for the period of 10.0 min each. After washing with water (RO), the next cycle was carried out using same procedure mentioned above. Three cycles with different whey protein concentration as feed was carried out.

Figure 6:
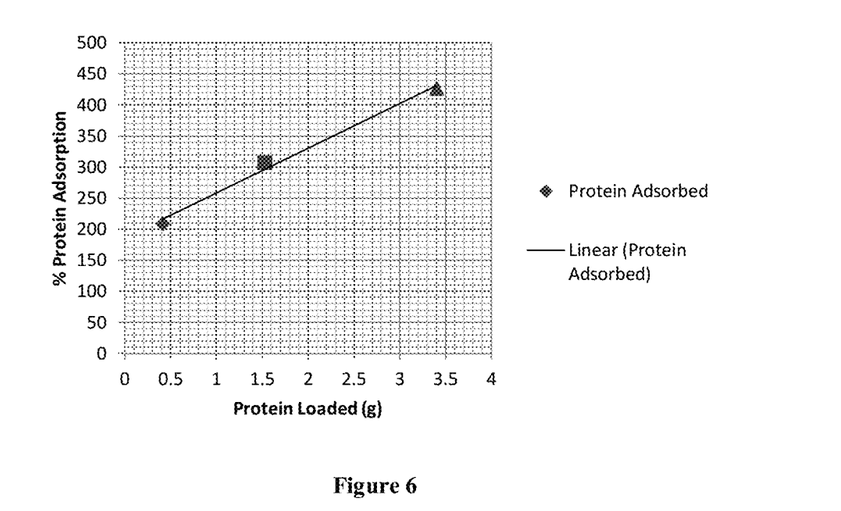
FIG. 6 is a graph illustrating the effect of protein concentration on adsorption in accordance with the teachings of the present invention.

FIG. 6 depicts the linear relation between the protein concentration in feed and adsorption of protein. This strongly suggests that the modified cotton cloth and membrane filtration device equipped with modified flow pattern developed under the present invention is highly suitable for large scale operations.

Example 7

The verification of product obtained as elution (Example 6) was carried out using sodium dodecyl sulfate polyacrylamide gel electrophoresis (SDS-PAGE). The SDS-PAGE was carried out as per the procedure described by Laemmli (Laemmli, U. K. (1970). Nature, 227, 680-685) using a 3.9% stacking gel and 12.5% resolving gel and gels were stained by Coomassie brilliant blue G-250. The identification of the protein present in the elution was carried out using low range molecular weight marker from Sigma (6500-66000) Catalogue no. M3913. FIG. 7 shows the protein present in the elution that corresponds to albumin, β-lactoglobulins and α-lactalbumin, which are the major whey proteins. This confirmed that the products obtained as elution are the whey proteins.

Example 8

The elution obtained (Example 6) was directly subjected to freeze drying without any treatment. FIG. 7 shows the product obtained after freeze drying, which was kept in plastic petri plate.

Advantages of the Invention

The main advantage of the present invention is the combination of ion exchange chromatography and membrane filtration device equipped with modified flow pattern to obtain whey proteins in a single process step in concentrated form that can be directly used for freeze drying, spray drying, etc.

Another advantage of the present invention is the development of modified cotton cloth that ensures higher pore size that means low fouling and high throughput, and low preparation and maintenance cost in comparison with the commercially available polymeric membranes or chromatography adsorbent media.

We claim:
1. A system for separating whey proteins from whey, said system comprising:
a filtration unit (11) comprising a bottom plate (12) at a first extremity, a top plate (13) at a second extremity opposite to the first extremity, a permeate spacer (14) placed proximate to and in spaced apart relation with respect to the bottom plate (12), at least one porous filter (15) placed proximate to and in spaced apart relation with respect to the permeate spacer (13) and a gasket (16) provided between the porous filter (15) and the top plate (13); the filtration unit defining an input port (17), a permeate port (18) and a retentate port (19); the porous filter comprising cotton cloth having an ion exchange element deposited thereupon;
a feed storage unit (20) connected to the input port (17) of the filtration unit via a first pump (21);
an eluent storage unit (22) connected to the input port (17) of the filtration unit via a second pump (23);
a first set of tubing (24) comprising an input end (25), a first output end (26), a second end (27), a first valve (28) for controlling an amount of fluid flowing out of the first output end (26) and a second valve (29) for controlling an amount of fluid flowing out of the second output end (27), the input end being (25) connected to the permeate port (18), the first output end (26) being connected to the feed storage unit (20) and the second output end (27) being connected to the eluent storage unit (22); and
a second set of tubing (30) comprising a input end (31), a first output end (32), a second end (33), a first valve (34) for controlling an amount of fluid flowing out of the first output end (32) and a second valve (35) for controlling an amount of fluid flowing out of the second output end (33), the input end (31) being connected to the retentate port (19), the first output end (32) being connected to the feed storage unit (20) and the second output end (33) being connected to the eluent storage unit (22).

2. The system as claimed in claim 1, wherein the second set of tubing (30) further comprises:
 a first pressure sensor (36) located between the first valve (34) and the first output end (32);
 a first flow rate sensor (37) located between the first pressure sensor (36) and the first output end (32);
 a third valve (38) located between the first flow rate sensor (36) and the first pressure sensor (36);
 a second pressure sensor (39) located between the second valve (35) and the second output end (33);
 a second flow rate sensor (40) located between the second pressure sensor (39) and the second output end (33); and
 a fourth valve (41) located between the second flow rate sensor (40) and the second pressure sensor (39).

3. The system as claimed in claim 2, further comprising a third tubing set (42) connecting the feed storage unit (20) to the input port (17) of the filtration unit (11) via the first pump (21) and connecting the eluent storage unit (22) connected to the input port (17) of the filtration unit (11) via the second pump (23).

4. The system as claimed in claim 3, wherein the third tubing set (42) comprises:
 an output end (43) connected to the filtration unit (11);
 an intermediate portion (44);
 a first input end (45) connected to the feed storage unit (20);
 a second input end (46) connected to the eluent storage unit (22);
 a first input section (47) located between the intermediate portion (44) and the first input end (45) and accommodating the first pump (21);
 a second input section (48) located between the intermediate portion (44) and the second input end (46) and accommodating the second pump (23);
 a first control valve (49) located between the feed storage unit (20) and the first pump (21);
 a second control valve (50) located between the first pump (21) and the intermediate portion (44);
 a third control valve (51) located between the eluent storage unit (22) and the second pump (23); and
 a fourth control valve (52) located between the second pump (23) and the intermediate portion (44).

5. The system as claimed in claim 4, further comprising a control unit (53) adapted to control operation of the first pump (21) and the second pump (23).

6. The system as claimed in claim 5, wherein the control unit (53) is further adapted to control operation of the first valve (28) forming part of the first tubing set (24); the second valve (29) forming part of the first tubing set (24); the first valve (34) forming part of the second tubing set (30); the second valve (35) forming part of the second tubing set (30); the third valve (38) forming part of the second tubing set (30); the fourth valve (41) forming part of the second tubing set (30); the first control valve (49) forming part of the third tubing set (42); the second control valve (50) forming part of the third tubing set (42); the third control valve (51) forming part of the third tubing set (42); and the fourth control valve (52) forming part of the third tubing set (42) such that:
 during operation of the first pump (21), the third control valve (51) forming part of the third tubing set (42); and the fourth control valve (52) forming part of the third tubing set (42); the second valve (29) forming part of the first tubing set (24); the second valve (35) forming part of the second tubing set (30); and the fourth valve (41) forming part of the second tubing set (30) are maintained in a closed state; and
 during operation of the first pump (21), the first control valve (49) forming part of the third tubing set (42); the second control valve (50) forming part of the third tubing set (42); the first valve (28) forming part of the first tubing set (24); the first valve (34) forming part of the second tubing set (30); and the third valve (38) forming part of the second tubing set (30) are controlled to be in any one of an open state or a closed state;
 during operation of the second pump (23), the first control valve (49) forming part of the third tubing set (42); the second control valve (50) forming part of the third tubing set (42); the first valve (28) forming part of the first tubing set (24); the first valve (34) forming part of the second tubing set (30); and the third valve (38) forming part of the second tubing set (30) are maintained in a closed state; and
 during operation of the second pump (23), the third control valve (51) forming part of the third tubing set (42); and the fourth control valve (52) forming part of the third tubing set (42); the second valve (29) forming part of the first tubing set (24); the second valve (35) forming part of the second tubing set (30); and the fourth valve (41) forming part of the second tubing set (30) are controlled to be in any one of an open state or a closed state.

7. The system as claimed in claim 1, wherein the first pump has a first speed and the second pump has a second speed, with the second speed being lesser than the first speed.

8. A process for separating whey proteins, comprising the steps of:
 (a) providing a system comprising:
  a filtration unit (11) comprising a bottom plate (12) at a first extremity, a top plate (13) at a second extremity opposite to the first extremity, a permeate spacer (14) placed proximate to and in spaced apart relation with respect to the bottom plate (12), at least one porous filter (15) placed proximate to and in spaced apart relation with respect to the permeate spacer (13) and a gasket (16) provided between the porous filter (15) and the top plate (13); the filtration unit defining an input port (17), a permeate port (18) and a retentate port (19); the porous filter comprising cotton cloth having an ion exchange element deposited thereupon;
  a feed storage unit (20) connected to the input port (17) of the filtration unit via a first pump (21);
  an eluent storage unit (22) connected to the input port (17) of the filtration unit via a second pump (23);
  a first set of tubing (24) comprising an input end (25), a first output end (26), a second end (27), a first valve (28) for controlling an amount of fluid flowing out of the first output end (26) and a second valve (29) for controlling an amount of fluid flowing out of the second output end (27), the input end being (25) connected to the permeate port (18), the first output end (26) being connected to the feed storage unit (20) and the second output end (27) being connected to the eluent storage unit (22); and
  a second set of tubing (30) comprising a input end (31), a first output end (32), a second end (33), a first valve (34) for controlling an amount of fluid flowing out of the first output end (32) and a second valve (35) for controlling an amount of fluid flowing out of the second output end (33), the input end (31) being connected to the retentate port (19), the first output end (32) being connected to the feed storage unit (20) and the second output end (33) being connected to the eluent storage unit (22);

(b) passing an equilibration buffer through the filtration unit (11) to equilibrate the porous filter (15);

(c) passing a source of whey protein through the filtration unit (11) to allow whey proteins to be adsorbed on the porous filter;

(d) washing the filtration unit (11); and (e) passing an eluent solution through the filtration unit (11) to obtain the whey proteins.

9. The method as claimed in claim 8, wherein the steps of passing the equilibration buffer through the filtration unit (11); passing the source of whey protein through the filtration unit (11); and washing the filtration unit (11), are performed using the first pump operating at a first speed and the step of passing the eluent solution through the filtration unit is performed using the second pump operating at a second speed, with the second speed being lesser than the first speed.

10. The method as claimed in claim 8, further comprising forming the cotton cloth having the ion exchange element deposited thereupon by:

treating a cotton cloth with a mixture of chlorosulphonic acid and chloroform to obtain a first stage treated cloth;

treating the first stage treated cloth thus obtained with chloroform to obtain a second stage treated cloth;

treating the second stage treated cloth thus obtained with a solution comprising sodium hydroxide to obtain a third stage treated cloth;

treating the third stage treated cloth thus obtained with glycine to obtain a fourth stage treated cloth; and washing the fourth stage treated cloth thus obtained with water to obtain the cotton cloth having an ion exchange element deposited thereupon.

* * * * *